United States Patent [19]

Johnson

[11] Patent Number: 4,958,415
[45] Date of Patent: Sep. 25, 1990

[54] CONNECTOR FOR LATERAL CABLE OF TIRE CHAINS

[75] Inventor: Eric Johnson, Vancouver, Wash.

[73] Assignee: Quality Chain Corp., Portland, Oreg.

[21] Appl. No.: 363,624

[22] Filed: Jun. 7, 1989

[51] Int. Cl.⁵ .................. A44B 21/00; B60C 27/10
[52] U.S. Cl. ................................. 24/69 TT; 152/219
[58] Field of Search ............ 24/69 TT, 69 T, 68 TT, 24/71 TT; 152/213 A, 217, 219

[56] References Cited

U.S. PATENT DOCUMENTS

| | | | |
|---|---|---|---|
| 1,414,467 | 5/1922 | Hogshead et al. | 24/69 TT |
| 1,624,967 | 4/1927 | Nichols | 24/69 TT |
| 2,051,690 | 8/1936 | Ehlin | 24/69 TT |
| 2,228,399 | 1/1941 | Ostman | 24/69 TT |
| 2,705,520 | 4/1955 | Erving | 24/69 TT |
| 2,710,437 | 6/1955 | Wilson | 24/69 TT |
| 3,752,204 | 8/1973 | Ouellette | 152/219 |
| 4,306,602 | 12/1981 | Nestlen | 24/69 TT |
| 4,615,368 | 10/1986 | Nestlen | 152/213 A |

Primary Examiner—Victor N. Sakran

[57] ABSTRACT

Traction-enhancing tire chains with a lateral cable having a tension-applying connector for interconnecting the opposite ends of the lateral cable for attaching the tire chains to a tire. A clasp is attached to a pin slidably disposed in a cam slot defined in a tensioning lever attached to one end of the lateral cable. The clasp hooks about a selected anchor on the opposite end portion of the lateral cable and applies tension to the lateral cable as the lever is rotated to a tensioning position. The clasp slides along the cam slot and is pivotable with respect to the lever. A hook on the movable end of the lever extends over the lateral cable to hold the lever in the tensioning position. The lever and a hook which is also slidably disposed in the cam slot cooperatively hold excess cable against the side wall of the tire to keep it from flapping about during use of chains incorporating the fastener.

12 Claims, 4 Drawing Sheets

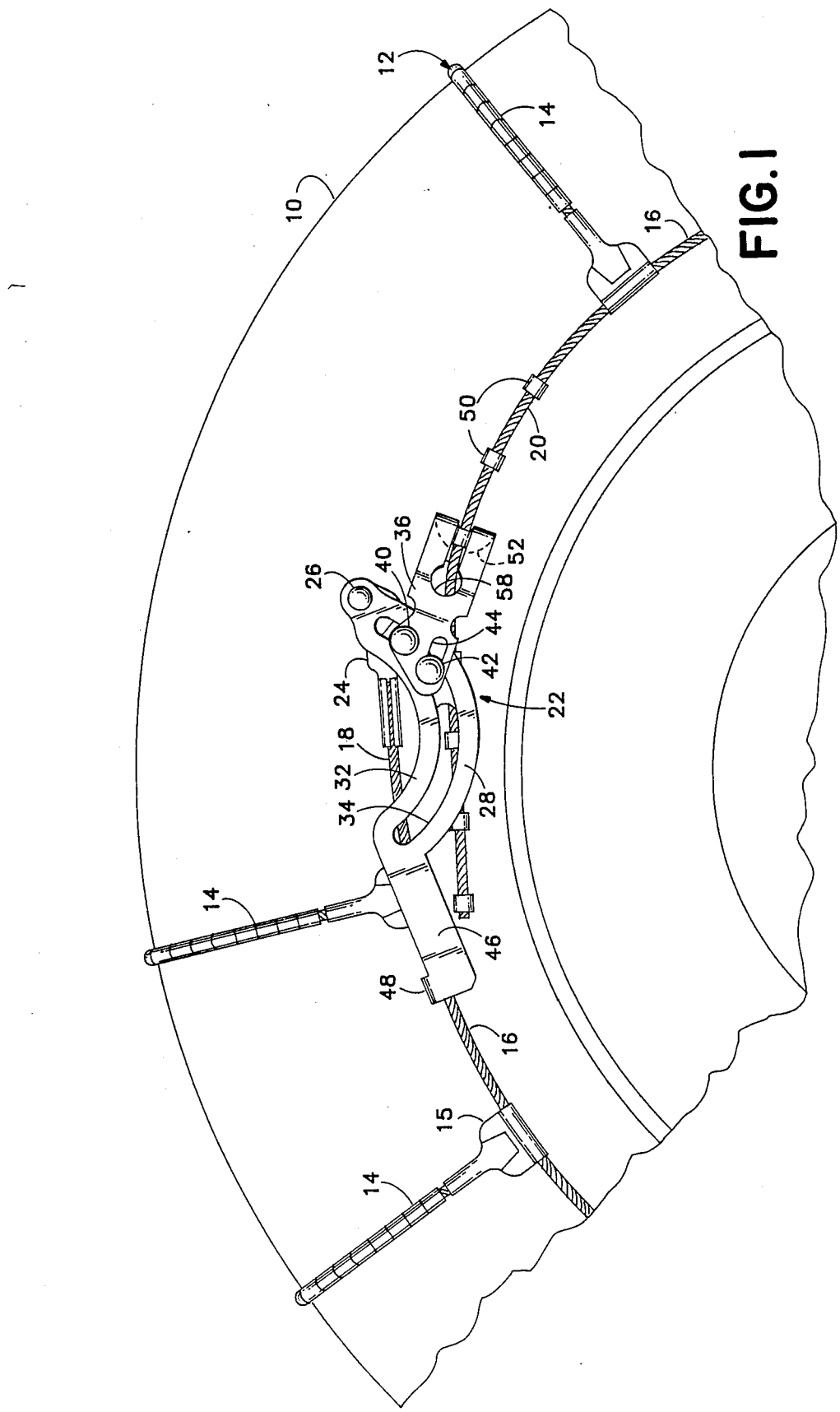

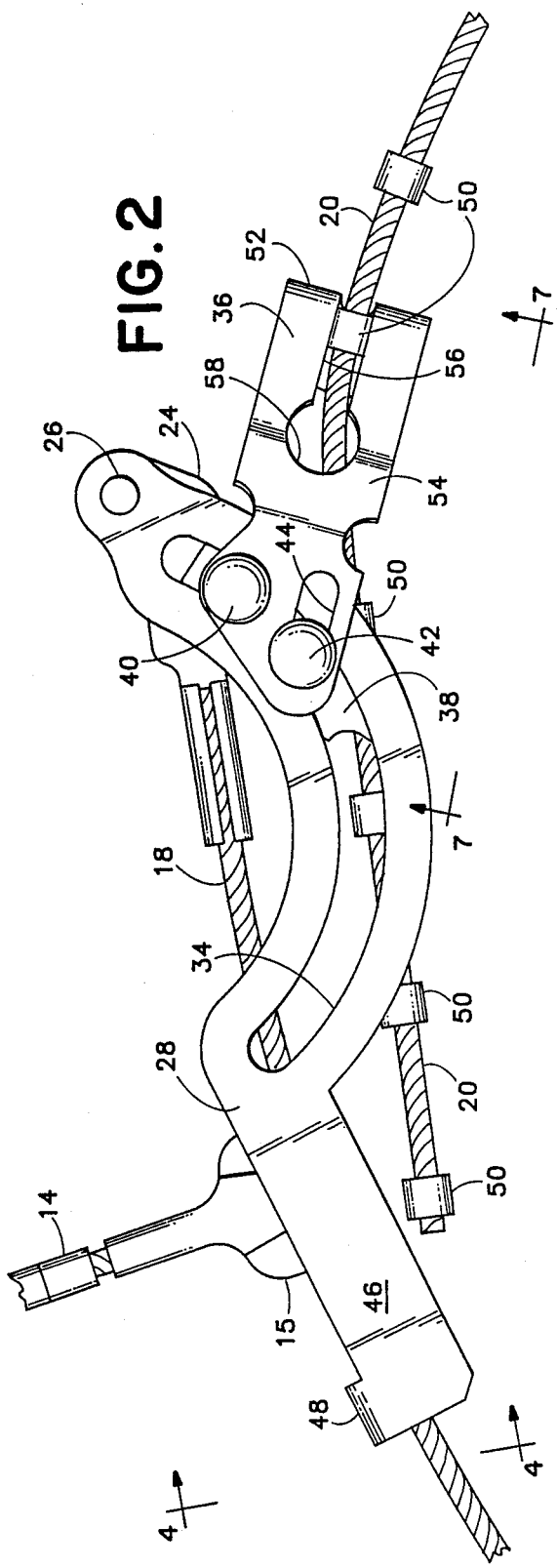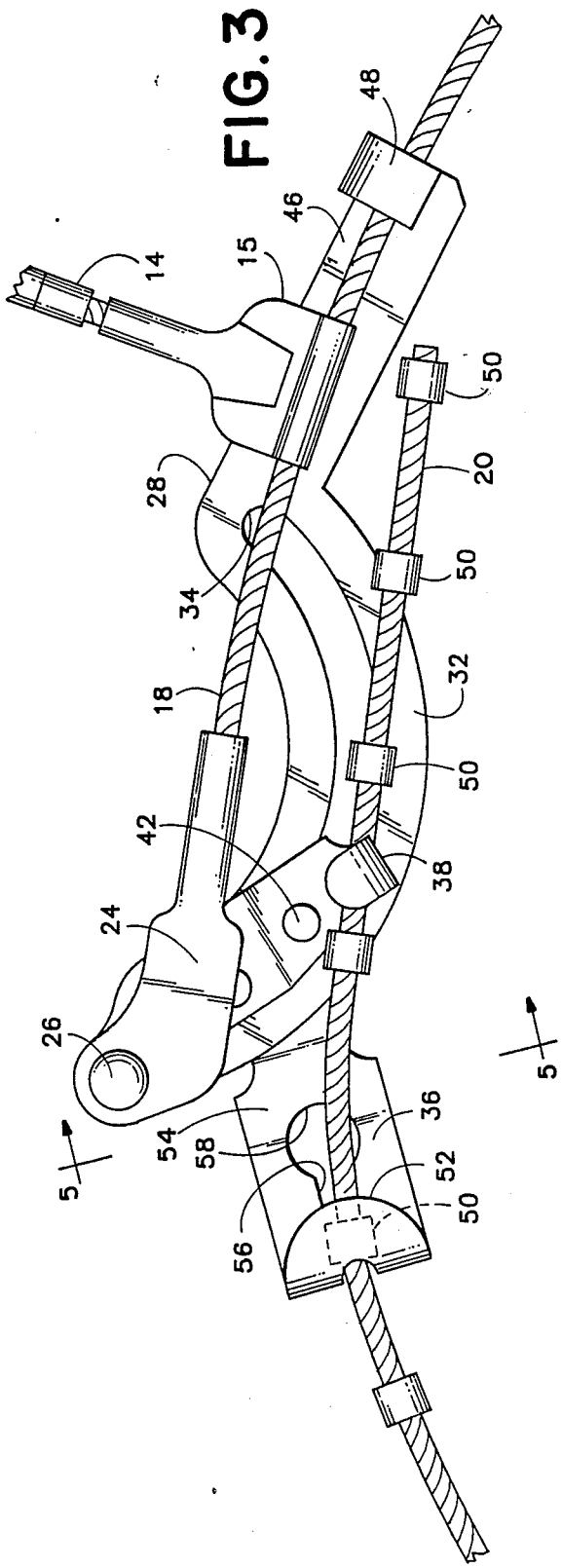

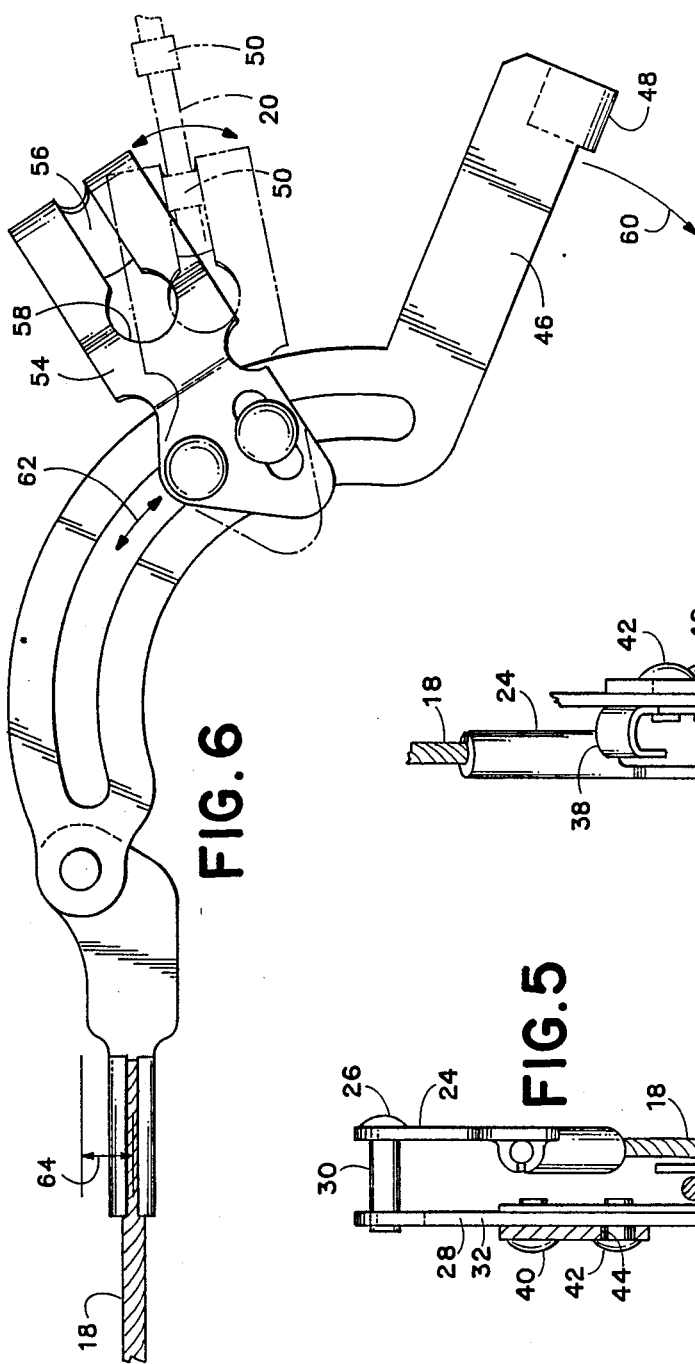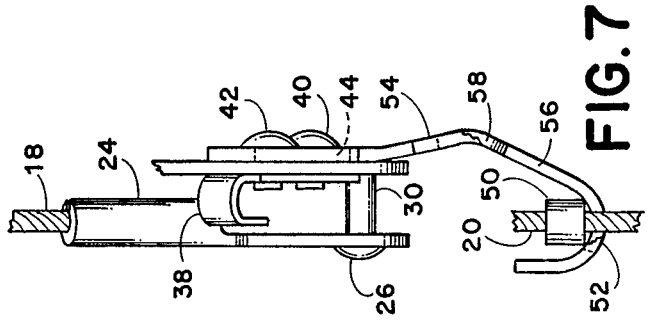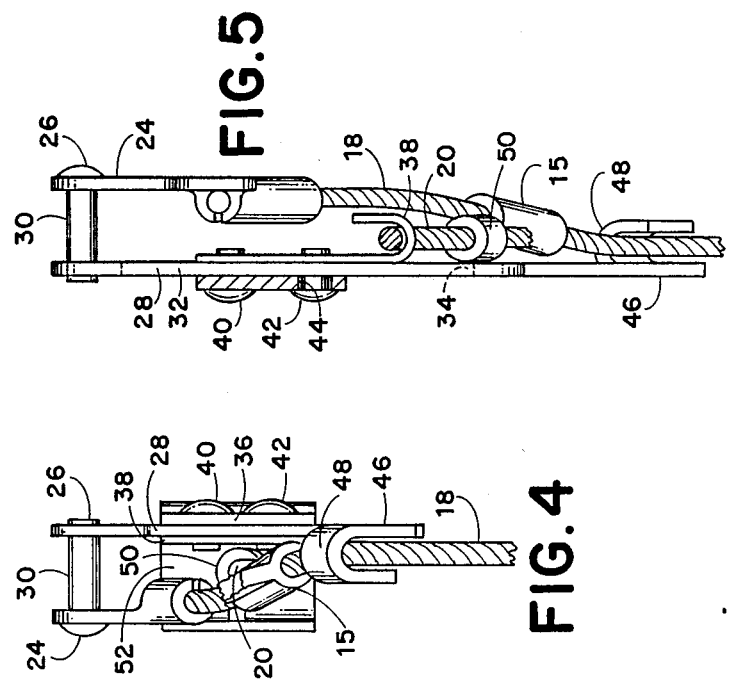

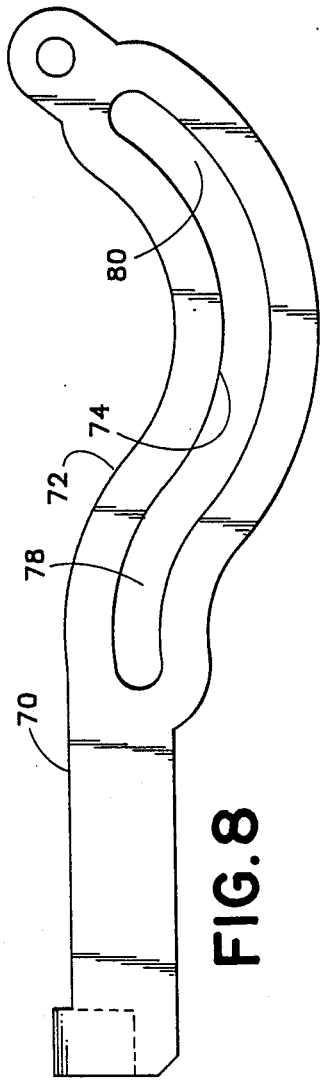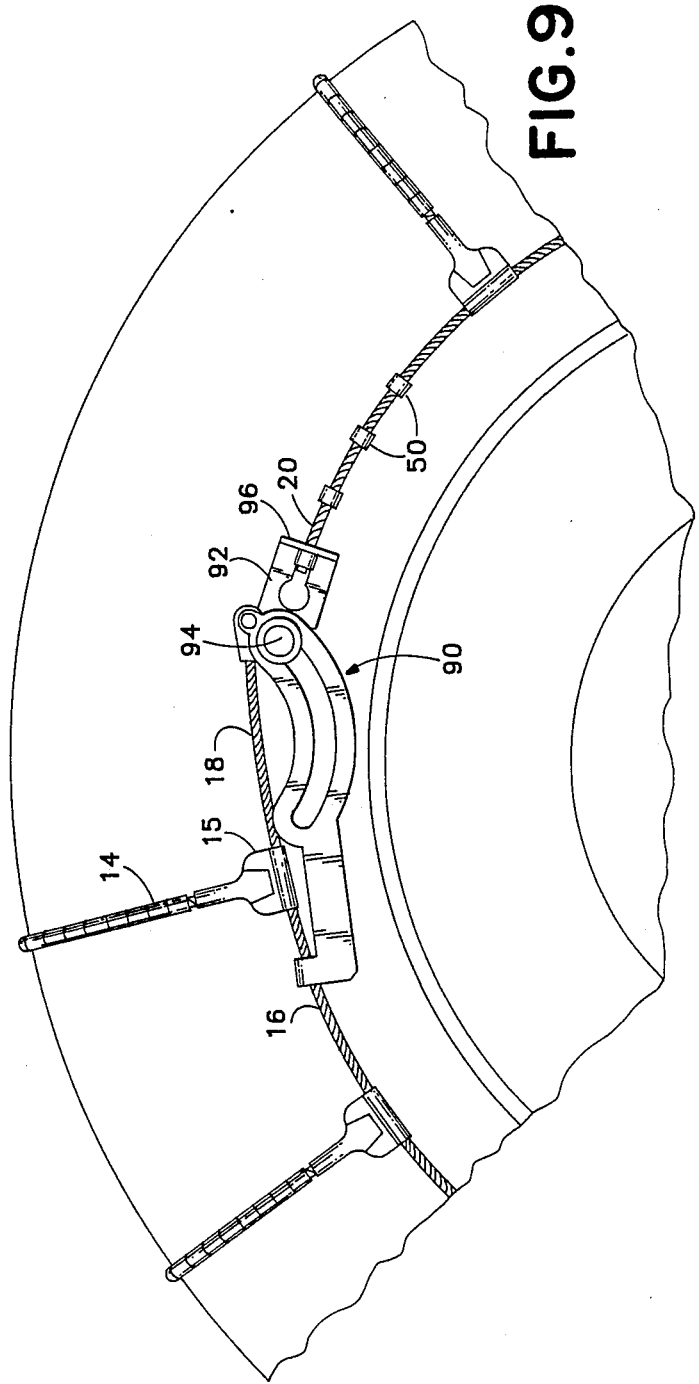

CONNECTOR FOR LATERAL CABLE OF TIRE CHAINS

BACKGROUND OF THE INVENTION

The present invention relates to tire chains and particularly to a tensioning connector assembly for a lateral cable of cable-type tire chains.

Modern tire chains, especially those designed particularly for use with radial ply tires, utilize strong lateral cables extending circumferentially alongside the sidewalls on each side of the tire. Such cable-type chains are considerably easier to mount and tighten than were previously available tire chains which used heavy chain links extending both across the tire tread and circumferentially alongside the tire walls. Nevertheless, it is difficult to tighten even such cable-type tire chains, and yet it is important that the tire chains be tight, so as to avoid loose portions of the chains being caught in the fender well of a vehicle, and to avoid unnecessary wear on the tire chains themselves and on the tires on which they are used.

In the past, cable-type chains have incorporated a fastener on one end of a lateral cable, the fastener incorporating a keyhole-shaped slot to engage stoppers mounted on the opposite end portion of a lateral cable, thus providing incremental adjustment of the effective circumference of a lateral cable. However, engagement of such a stopper in a keyhole-shaped slot necessarily results in some slack being provided, leaving the lateral cables somewhat looser than is really desired. Nestlen U.S. Pat. No. 4,615,368 discloses tire chains having lateral cables and a fastener incorporating a clasp defining a keyhole-shaped slot, to engage anchors or stoppers mounted on the opposite end of the lateral cable with a certain amount of security. Nestlen, however, does not disclose any device for actually applying tension to the lateral cable.

Prior link-type tire chains have included various chain-fastening devices incorporating levers and hooks which act to apply tension in such chains, but such fasteners useful for link-type tire chains are not particularly useful for tire chains incorporating lateral cables. Examples of some such chains are disclosed in Nestlen U.S. Pat. No. 4,306,602, Wilson U.S. Pat. No. 2,710,437, Hewel U.S. Pat. No. 2,198,478, Heinecke U.S. Pat. No. 1,866,889, Bennett U.S. Pat. No. 1,573,759, Eckart U.S. Pat. No. 1,512,833, and Hubble U.S. Pat. No. 1,418,149.

Other devices for use with link-type tire chains provide for latching a fastener securely once it has been closed. Some of such devices are disclosed in St. Pierre U.S. Pat. No. 2,612,670, Myers et al. U.S. Pat. No. 2,153,003, Stahl U.S. Pat. Nos. 2,123,864 and 1,851,460, and Thomas U.S. Pat. No. 1,816,941. Barnett et al. U.S. Pat. No. 4,130,155 and Searfoss U.S. Pat. No. 1,483,686 disclose lever devices for applying tension in link-type tire chains.

Erving U.S. Pat. No. 2,705,520, Eckroat U.S. Pat. No. 1,681,526, and Tawney U.S. Pat. No. 1,310,456 all disclose devices for latching a tire chain in a closed position. While Erving discloses tire chains using lateral cables, it does not disclose a closure device which permits adjustment of the effective circumferential length of the lateral cable of the chains.

Particularly in tire chains intended for use on large tires, such as truck tires, it is difficult to mount such tire chains by manually applying sufficient tension to latch an appropriate anchor device into a fastener of the type disclosed by Nestlen.

What is needed, then, is a fastener for tire chains including lateral cables extending circumferentially about the side wall of a tire, which is able to apply tension to the lateral cable and retain the tension in the lateral cable, rather than allowing a significant portion of the tension to be relaxed as the stopper affixed to one end of the cable is allowed to slide downward within the throat of a keyhole-shaped slot in a fastener.

SUMMARY OF THE INVENTION

The present invention overcomes the tendency of previously known cable-type tire chains to be too loose, and provides a connector overcoming the difficulty of mounting cable-type tire chains snugly onto a tire. In accordance with the present invention a connector assembly includes a clasp which is mounted slidably on a lever arm carried pivotably on one end of the lateral cable. The clasp slides in a curved cam slot during movement of the lever, and incorporates a hooked portion defining a keyhole-shaped slot for engaging a selected one of a number of stoppers spaced apart along an opposite end portion of the lateral cable. The lever can be rotated from a releasing position, with the clasp sliding along the cam slot, gradually increasing the mechanical advantage provided by the lever, until the lever has been moved to a tensioning position where a hook carried on the lever can engage the part of the cable to which the lever is attached. Thereafter, tension in the lateral cable, transmitted by the clasp, keeps the hook engaged with the cable.

It is therefore a principal object of the present invention to provide an improved connector assembly for securely fastening a lateral cable of a tire chain.

It is another important object of the present invention to provide a connector which can fasten the lateral cable of a set of tire chains under tension and continue to provide tension in the lateral cable after the chains have been fastened.

It is an important feature of the present invention that it provides a clasp slidably disposed with respect to a cam slot defined in a tensioning lever so as to provide tensioning action with mechanical advantage which increases as tension is applied.

It is another feature of the present invention that it provides a tensioning lever carried on an attachment plate mounted on a first end of a lateral cable in such a way as to provide space to retain any excess length of the opposite end portion of the lateral cable to restrain it from flapping dangerously.

It is yet a further feature of the present invention that it provides a clasp which is pivotable with respect to the tensioning lever and the cam slot in which the clasp is slidably mounted, to combine the benefits of the camming action of the slot with an ability of the clasp to apply tension directly along the opposite end portion of the cable.

It is a principal advantage of the present invention that it provides an ability to fit cable-type tire chains to tires more securely than has previously been possible.

The foregoing and other objectives, features and advantages of the present invention will be more readily understood upon consideration of the following detailed description of the invention taken in conjunction with the accompanying drawings

BRIEF DESCRIPTION OF THE DRAWINGS

FIG. 1 is a side elevational view of a portion of a tire equipped with cable-type tire chains including a connecting device incorporating the present invention.

FIG. 2 is a side elevational view, at an enlarged scale, of the connecting device for the tire chains shown in FIG. 1.

FIG. 3 is a side elevational view of the connecting device shown in FIG. 2, taken from the opposite side.

FIG. 4 is a view of the connecting device shown in FIGS. 1-3, taken along line 4—4 of FIG. 2.

FIG. 5 is a sectional view of the connecting device shown in FIGS. 1-4, taken along line 5—5 of FIG. 3.

FIG. 6 is a side elevation view of the connecting device, with the lever shown in a releasing position.

FIG. 7 is a view of a clasp plate which is a portion of one embodiment of the connecting device of the present invention, taken along line 7—7 of FIG. 2.

FIG. 8 is a side elevational view of a lever which is an alternative embodiment of a portion of the connecting device of the invention.

FIG. 9 is a side elevational view of a connecting apparatus for a et of tire chains which is an alternative embodiment of the invention.

DETAILED DESCRIPTION OF THE INVENTION

Referring now to the drawings, in FIG. 1, a wheel and tire combination 10 is shown equipped with a set of cable-type tire chains 12 including a plurality of cross chains 14 which may be of either cable or chain link construction. Each of the cross chains 14 extends across the tread and a portion of each side wall of the tire, and the opposite ends of the cross chains 14 are connected as by a connector 15 to a respective lateral cable extending circumferentially of the tire alongside the side wall of the tire, as does the lateral cable 16. The lateral cable located on the opposite side of the tire 10 from the lateral cable 16 may have its two ends connected with each other by a suitable releasable connector of a previously known type, which is not shown in detail herein. The lateral cable 16 includes a head end portion 18 and an opposite tail end portion 20, and may be of a suitable steel or other cable material of suitable strength and ability to withstand abrasion.

A connector assembly 22 adjustably connects the head end portion 18 to the tail end portion 20 and applies a required amount of tension to hold the tire chains 12 snugly to the wheel and tire 10. As will be understood, the process of tightening the lateral cable 16 will pull each of the cross chains 14, thus tightening the lateral cable on the opposite side of the tire indirectly.

The connector assembly 22 includes an attachment plate member 24 which is attached to the head end portion 18, as by a portion of the attachment plate being wrapped around and crimped onto the head end portion 18. The attachment plate 24 is generally planar except for its attachment to the lateral cable 16, and the head end portion 18 lies in or closely parallel with the plane of the attachment plate 24. One end of a short shaft 26 is fixedly attached to the attachment plate 24 and extends perpendicularly away from the plate at a position which is offset laterally from the center line of the lateral cable head end portion 18. A lever 28 is connected to the opposite end of the shaft 26 and is held apart from the attachment plate 24, a short distance such as 5/16 inch (8 mm), by a tubular spacer 30 surrounding the shaft 26 between the lever 28 and the attachment plate 24. The shaft 26 is rotatable with respect to either the attachment plate 24 or the lever 28, or both, permitting the lever 28 to rotate with respect to the attachment plate, between the position shown in FIGS. 1-3 and the position shown in FIG. 6.

The lever 28 includes an arcuately curved portion 32 defining a cam slot 34, whose function will be explained more fully presently. A clasp plate 36 and a cable end hook 38, both of suitably shaped metal plate, are located on opposite sides of the lever 28. The clasp plate 36 and the cable end hook 38 are interconnected with one another by a pair of pins, which may be rivets, extending through the cam slot 34. These pins, a pivot pin 40 and a limit pin 42, are slidable along the cam slot 34. The pivot pin 40 is fastened to the clasp plate 36 and the cable end hook 38 so as to permit rotation of the clasp plate 36 with respect to the cable end hook 38. The limit pin 42 is fixedly mounted in the cable end hook 38 and extends through the slot 34 and also through an arcuate limit slot 44 defined in the clasp plate 36, so that the clasp plate 36 can rotate about the pivot pin 40 through a limited angular range of motion, but is prevented from rotating further with respect to the cable end hook 38. It has been found desirable to provide an angular range of motion of about 42 degrees, limited by the length of the limit slot 42. The actual range of angular motion needed is determined by the shape of the cam slot 34, with the intent being to permit tension to be applied to the tail end portion 20 of the lateral cable 16 by means of the lever 28 acting through the clasp plate 36.

A lever arm 46 extends angularly away from curved portion 32 at the end thereof further from the shaft 26. A lever latching hook portion 48 extends laterally from the lever arm 46 to engage the head end portion 18 of the lateral cable 16, as shown in FIG. 4, to hold the lever 28 in a position extending generally along the head end portion 18 when the attachment apparatus of the present invention is secured in the tensioning position shown in FIGS. 1, 2, and 3.

The tail end portion 20 of the lateral cable 16 has several anchors 50, such as tubular metal collars swaged or crimped tightly onto the tail end portion 20 of the lateral cable 16. The clasp plate 36 extends away from the curved portion 32 of the lever 28 and defines a hooked end portion 52 which extends laterally in the direction generally toward the attachment plate 24 and thus around a portion of the lever 28 toward the tire 10 when the tire chain 12 is properly mounted as may be seen in FIG. 7. An intermediate portion 54 of the clasp plate 36 is located between the hooked end 52 and the pins 40 and 42.

A keyhole shaped slot 56 is defined in the intermediate portion 54 and extends into the hooked end portion 52, with an enlarged portion 58 of the keyhole slot 56 being located in the intermediate portion 54 of the clasp plate 36. The enlarged portion 58 is large enough to allow passage of the anchors 50 therethrough. The remainder of the keyhole slot 56 is wide enough to allow passage of the lateral cable 16, but not the anchors 50, so that tension can be maintained in the lateral cable 16 by engaging one of the anchors 50 in the hooked end portion 52 of the clasp plate 36.

In order to draw up the lateral cable 16 initially from a loose condition, after first connecting together the opposite ends of the lateral cable on the opposite side of the tire 10 from that shown in FIG. 1, the lever 28 is rotated to a position such as that shown in FIG. 6. With the lever 28 rotated to the position shown in FIG. 6, the clasp plate 36 and cable end hook 38 are moved along the cam slot 34, allowing the clasp plate 36 and the tail end portion 20 of the lateral cable 16 to be brought together. The tail end portion of the lateral cable 16 is then inserted through the keyhole slot 56 to place one of the anchors 50 within the hooked end portion 52 of the clasp plate 36.

Tension is thereafter applied to the lateral cable 16 by moving the lever arm 46 to rotate the lever 28 in the direction indicated by the arrow 60 in FIG. 6, allowing the pivot pin 40, carrying the clasp plate 36 and the cable end hook 38, to slide along the cam slot 34 in the direction indicated by the arrow 62 in FIG. 6. As tension is increased by movement of the lever arm 46, the shape of the curved portion 32 and the cam 34 defined therein result in the lever 28 producing a gradually increasing mechanical advantage. The ability of the clasp plate 36 to pivot about the pivot pin 40, within the limits established by the limit pin 42 and the limit slot 44, allows tension to be applied along the direction in which the tail end portion 20 extends away from the clasp plate 36.

Excess cable of the tail end portion 20 extending beyond the clasp plate 36 is engaged by the cable end hook 38 and thus is held in a position tending behind the curved portion 32, that is, between the lever 28 and the attachment plate 24. When the lever 28 has been rotated to the position shown in FIGS. 1-3, the hook portion 48 can be engaged around the head end portion 18 of the lateral cable as shown in FIG. 4. Because the location of the short shaft 26 on the attachment plate 24 is laterally offset from the center line of the head end portion 18 of the lateral cable 16, as shown by the arrow 64 in FIG. 6, tension applied to the curved portion 32 of the lever 28 by the clasp plate 36 tends to pull the lever 28 so as to hold the hook portion 48 engaged with the head end portion 18 of the lateral cable 16.

It will be appreciated that the hooked end portion 52, the cable end hook 38, the attachment plate 24, and the anchors 50 on the tail end portion 20 all fall substantially in a single plane as shown in FIGS. 4 and 5, thus resting against the sidewall of the tire 10 when the connector 22 is fastened and held under tension in the lateral cable 16. This, together with the upward extension of the junction between the curved portion 32 and the lever arm 46 above the head end portion 18 of the lateral cable 16, limits and minimizes the amount of abrasive rubbing of the tire chains 12 against the sidewall of the tire and tends to minimize any tendency of the lever 28 to twist away from the sidewall of the tire 10 as a result of centrifugal force during operation of a vehicle equipped with tire chains 12 including the connector 22.

Referring now to FIG. 8, a lever 70 is shown which may be used in place of the lever 28 depicted in FIGS. 1-7. The lever 70 includes a curved portion 72 defining a cam slot 74 which functions in generally the same manner as the cam slot 34, but is of a different shape. A first portion 78 of the cam slot 74 is adjacent the lever arm 76 and is concave toward the center of the tire 10 when the tire chains 12 are securely mounted using a connector including the lever 70. A second portion 80 of the cam slot 74 is located adjacent the attachment plate 24 and shaft 26, and is arcuately curved in the opposite direction similar to the curvature of the curved portion 32 of the lever 28, to allow the clasp plate 36 to slide along the cam slot 74 toward the shaft 26 while increasing the mechanical advantage of the lever 70 and still increasing the amount of tension in the lateral cable 16. The lever 70 tends to lie alongside the head end portion 18 somewhat more closely than does the lever 28.

Referring now also to FIG. 9 a connector 90 which is an alternative embodiment of the present invention includes a clasp plate 92 which is attached movably to the curved portion 32 of the lever 28 by a single pivot pin 94 engaged in the cam slot 34. The clasp plate 92 is mounted on the inner or rear side of the lever 28, closer to the tire 10. The clasp plate 92 has a hooked end 96 extending laterally outwardly away from the sidewall of the tire 10, thus opposite the direction and location of the clasp plate 36 in the connector 22 described previously. Except that there is no cable end hook nor limitation of the freedom of the clasp plate 92 to rotate about the pivot pin 94, operation of the connector 90 is similar to that of the connector 22 described hereinabove.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Connecting apparatus for interconnecting the opposite ends of a lateral cable of a set of tire chains comprising:
   (a) anchor means fixedly attached to said lateral cable proximate a tail end portion thereof;
   (b) tensioning lever means pivotally interconnected with a head end portion of said lateral cable and free to rotate from a releasing position in which said lever means extends away from said head end portion of said lateral cable to a tensioning position in which said lever means extends generally alongside said head end portion of said lateral cable;
   (c) means defining an arcuate cam associated with said tensioning lever means said cam including a cam slot; and
   (d) clasp means for engaging said anchor means, said clasp means being attached to said lever means in engagement with said cam slot and being free to follow said arcuate cam by movement along said cam slot in response to application of tension to said clasp means by said tail end portion of said lateral cable.

2. The apparatus of claim 1, said clasp means being free to pivot with respect to said cam, and said apparatus further including means for limiting freedom of said clasp means to pivot with respect to said cam, leaving said clasp means free to pivot with respect to said cam through a limited angular range of motion.

3. The apparatus of claim 1, including hook means associated with said lever means for engaging said lateral cable to retain said lever in said tensioning position.

4. The apparatus of claim 1 wherein said clasp means includes a clasp plate defining a keyhole shaped slot for receiving said tail end portion of said lateral cable and engaging said anchor means.

5. The apparatus of claim 4 further including pivot pin means engaged in said clasp plate for interconnecting said clasp plate with said cam slot, and limit means interconnected between said cam slot and said clasp plate for limiting rotation of said clasp means wherein said limit means includes a limit slot defined in said clasp plate and a limit pin having a first end slideably engaged in said limit slot and a body engaged in said cam slot.

6. The apparatus of claim 5 wherein said lever means is of metal in the form of a substantially flat plate, both said pivot means and said limit pin being slidably engaged in said cam slot.

7. The apparatus of claim 5, further including a hook plate, said pivot means and said limit pin having respective second ends both engaged in said hook plate, said hook plate being located on the opposite side of said lever means from said clasp plate.

8. The apparatus of claim 1 wherein said cam slot is in the form of an "S" curve having a first portion which is concave toward said head end portion of said lateral cable when said tensioning lever means is in said tensioning position, and a second portion adjoining said first portion, said second portion being concave away from said head end portion of said lateral cable when said tensioning lever means is in said tensioning position.

9. The apparatus of claim 1 wherein said pivot means includes an attachment plate fixedly attached to said head end of said lateral cable and defining a pivot axis located laterally offset from said head end portion of said lateral cable and oriented perpendicular to said head end portion.

10. The apparatus of claim 9, said attachment plate defining a plane and said head end portion of said lateral cable extending closely parallel with said plane, said pivot axis extending perpendicular to said plane.

11. Connecting apparatus for interconnecting the opposite ends of a lateral cable of a set of tire chains, comprising:
 (a) anchor means fixedly attached to said lateral cable proximate a tail end portion thereof;
 (b) tensioning lever means pivotally interconnected with a head end portion of said lateral cable and free to rotate from a releasing position in which said lever means extends away from said head end portion of said lateral cable to a tensioning position in which said lever means extends generally alongside said head end portion of said lateral cable;
 (c) means defining an arcuate cam associated with said tensioning lever means; and
 (d) clasp means for engaging said anchor means, said clasp means being attached to said lever means in slideable engagement with said cam and being free to follow said cam in response to application of tension to said clasp means by said tail end portion of said lateral cable, said clasp means including a clasp plate defining a keyhole shaped slot for receiving said tail end portion of said lateral cable and engaging said anchor means.

12. The connected apparatus of claim 11 wherein said cam includes an arcuate cam slot defined in said lever means and said clasp means includes a pin extending through said clasp plate and engaging said arcuate cam slot.

* * * * *

UNITED STATES PATENT AND TRADEMARK OFFICE
CERTIFICATE OF CORRECTION

PATENT NO. : 4,958,415

DATED : September 25, 1990

INVENTOR(S) : Eric Johnson

It is certified that error appears in the above-identified patent and that said Letters Patent is hereby corrected as shown below:

Col. 3, Line 25, change "et" to --set--.

Signed and Sealed this

Twenty-first Day of January, 1992

Attest:

HARRY F. MANBECK, JR.

*Attesting Officer*              *Commissioner of Patents and Trademarks*